United States Patent
Kim et al.

(10) Patent No.: US 11,168,160 B2
(45) Date of Patent: *Nov. 9, 2021

(54) POLYBUTADIENE POLYMERS AND RUBBER COMPOSITIONS INCORPORATING SAME FOR LOW TEMPERATURE APPLICATIONS

(71) Applicant: Bridgestone Corporation, Chuo-ku (JP)

(72) Inventors: Hyeonjae Kim, Copley, OH (US); Joshua S. Dickstein, Copley, OH (US); Dennis R. Brumbaugh, North Canton, OH (US); Zengquan Qin, Nashville, TN (US)

(73) Assignee: Bridgestone Corporation, Chuo-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/863,458

(22) Filed: Apr. 30, 2020

(65) Prior Publication Data

US 2020/0255558 A1    Aug. 13, 2020

Related U.S. Application Data

(63) Continuation of application No. 16/060,213, filed as application No. PCT/US2016/065368 on Dec. 7, 2016, now Pat. No. 10,640,589.

(Continued)

(51) Int. Cl.
*C08F 36/06* (2006.01)
*C08K 3/04* (2006.01)

(Continued)

(52) U.S. Cl.
CPC ............. *C08F 36/06* (2013.01); *C08F 4/52* (2013.01); *C08K 3/04* (2013.01); *C08K 3/06* (2013.01);

(Continued)

(58) Field of Classification Search
CPC .. C08L 21/00; C08L 23/00; C08L 9/00; C08L 7/02; C08L 15/02; C08L 47/00;

(Continued)

(56) References Cited

U.S. PATENT DOCUMENTS 9,399,689 B2    7/2016  Tamaki et al.
2014/0031502 A1* 1/2014  Qin .................... C08F 4/545
                                                          526/126

FOREIGN PATENT DOCUMENTS

JP    2007161918 A    6/2007

OTHER PUBLICATIONS

Japanese Office Action dated Aug. 18, 2020, pertaining to Japanese patent application No. 2018-549143.

(Continued)

*Primary Examiner* — William K Cheung
(74) *Attorney, Agent, or Firm* — Meredith E. Hooker; Stephanie Williams (57) ABSTRACT

Embodiments of 1,4-polybutadiene rubber compositions useful at low temperatures are provided, wherein the 1,4-polybutadiene incorporated therein comprises a cis content of at least 85 to about 92%, a vinyl content of at about 1% to about 5%, and a trans content of about 3 to about 12%, and wherein the 1,4-polybutadiene has an enthalpy of melting $\Delta H_m$ of about 5 to about 25 J/g° C. as measured via differential scanning calorimetry (DSC).

20 Claims, 1 Drawing Sheet

Related U.S. Application Data (60) Provisional application No. 62/263,821, filed on Dec. 7, 2015.

(51) Int. Cl.
```
C08K 3/06      (2006.01)
C08L 47/00     (2006.01)
C08L 21/00     (2006.01)
C08F 4/52      (2006.01)
C08L 9/00      (2006.01)
C08L 7/02      (2006.01)
C08L 15/02     (2006.01)
C08L 19/00     (2006.01)
```

(52) U.S. Cl.
CPC ............... *C08L 9/00* (2013.01); *C08L 21/00* (2013.01); *C08L 47/00* (2013.01); *C08F 2500/01* (2013.01); *C08L 7/02* (2013.01); *C08L 15/02* (2013.01); *C08L 19/00* (2013.01)

(58) Field of Classification Search
CPC .. C08L 19/00; C08K 3/06; C08K 3/04; C08K 2/04; C08F 2500/01; C08F 4/52; C08F 36/06; C08F 136/06
USPC ...................................................... 526/340.4
See application file for complete search history.

(56) References Cited

OTHER PUBLICATIONS

Japanese Office Action dated Jun. 9, 2020, pertaining to Japanese patent application No. 2018-549143.
Communication pursuant to Article 94(3) EPC dated Apr. 29, 2020, pertaining to European Patent Application No. 16873763.3.

\* cited by examiner

POLYBUTADIENE POLYMERS AND RUBBER COMPOSITIONS INCORPORATING SAME FOR LOW TEMPERATURE APPLICATIONS

CROSS-REFERENCE TO RELATED APPLICATIONS

This application is a continuation of U.S. patent application Ser. No. 16/060,213 filed Jun. 7, 2018, now issued as U.S. Pat. No. 10,640,589, which is a national stage application of PCT Application Serial No. PCT/US16/65368 filed Dec. 7, 2016, which claims priority to U.S. Provisional Application Ser. No. 62/263,821 filed Dec. 7, 2015, all of which are incorporated by reference herein in their entirety.

TECHNICAL FIELD

Embodiments of the present disclosure are generally related to 1,4-polybutadiene rubber compositions, and are specifically related to 1,4-polybutadiene rubber compositions especially suited for low temperature tire applications.

BACKGROUND

In tire manufacturing, high cis 1,4-polybutadiene (e.g., polymers with a cis-1,4 linkage content of 95% or greater) is commonly used due to its excellent mechanical properties. However, at lower temperatures of −30° C. and below, these compositions are susceptible to crystallization. Crystallization may stiffen the tire at these lower temperatures, thereby preventing the tires from maintaining the desired contact with the road during snowy and icy conditions.

Accordingly, a continual need exists for improved 1,4-polybutadiene rubber compositions which resist low temperature crystallization while maintaining suitable strength and wear resistance.

SUMMARY

Embodiments of the present disclosure are directed to 1,4-polybutadiene rubber compositions which perform well in low temperature tire and non-tire applications. For example, and not by way of limitation, these rubber compositions may be used in the tire treads of winter tires. Moreover, the present 1,4-polybutadiene rubber compositions are not only flexible at low temperatures but also exhibit outstanding wear resistance and excellent mechanical properties comparable to similar or higher cis polybutadiene rubber compositions.

According to one embodiment, a polymer is provided, wherein the polymer comprises 1,4-polybutadiene defined by a cis content of at least 85 to about 92%, a vinyl content of at about 1% to about 5%, and a trans content of about 3 to about 12%. The polymer has an enthalpy of melting $\Delta H_m$ of about 5 to about 25 J/g° C. as measured via differential scanning calorimetry (DSC).

According to another embodiment, a rubber composition is provided, the rubber composition comprising the 1,4-polybutadiene polymer, curative, and reinforcing filler.

According to yet another embodiment, a method of producing 1,4-polybutadiene is provided. The method comprises polymerizing a solution comprising 1,3-butadiene to yield 1,4-polybutadiene rubber having a cis content of at least 85 to about 92%, a vinyl content of at about 1% to about 5%, and a trans content of about 3 to about 12%, wherein the polymerization is catalyzed with a catalyst comprising a lanthanide metal complex.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

BRIEF DESCRIPTION OF THE DRAWINGS

The following detailed description of specific embodiments of the present disclosure can be best understood when read in conjunction with the drawings enclosed herewith.

The embodiments set forth in the drawings are illustrative in nature and not intended to be limiting of the embodiments defined by the claims. Moreover, individual features of the drawings will be more fully apparent and understood in view of the detailed description.

DETAILED DESCRIPTION

Embodiments of the present disclosure are directed to 1,4-polybutadiene rubber compositions having improved resistance to crystallization at low temperatures (e.g., −30° C. or below). As stated above, crystallization at low temperatures is undesirable, because it hardens the tire and prevents the tire from adjusting to the contours of the road, especially in wet or snowy conditions. Thus, reduced crystallization is desirable at low temperatures, and is achieved by the 1,4-polybutadiene rubber compositions of the present disclosure. Specifically, the present 1,4-polybutadiene rubber compositions may provide an improved benefit to winter tires, specifically to winter tire treads. The 1,4-polybutadiene rubber compositions may comprise a 1,4-polybutadiene polymer with a cis content of at least 85 to about 92%, a vinyl content of at about 1% to about 5%, and a trans content of about 3 to about 12%. As used herein, "cis content" refers to the percentage of cis-1,4 linkages in the 1,4-polybutadiene. Similarly, "trans content" refers to the percentage of trans-1,4 linkages in the 1,4-polybutadiene. Finally, "vinyl content" refers to the percentage of 1,2-vinyl linkages in the 1,4-polybutadiene.

As used herein, the "1,4-polybutadiene polymer" may refer to the polydiene prior to blending with other rubber additives to produce rubber compositions used in tire and non-tire applications. As used herein, "1,4-polybutadiene rubber composition" or the "rubber composition" refers to the polymer (e.g., 1,4-polybutadiene) and the additional fillers and additives blended therewith for use in tire and non-tire applications.

Without being bound by theory, this vinyl content range hinders crystallization, and has surprisingly shown the ability to reduce crystallization at lower temperatures, such at −30° C. and below. As a result, the present 1,4-polybutadiene rubber compositions provide improved low temperature performance, and thus provide improved performance on ice or snow when incorporated into a winter tire tread compound.

As stated above, the cis content of this 1,4-polybutadiene rubber is between about 85% to about 92%. Surprisingly, the 1,4-polybutadiene rubber compositions of the present disclosure do not stiffen at low temperature as much as other 1,4-polybutadiene rubbers of similar cis content but prepared with a different polymerization catalyst system. Accordingly, the compositions of this disclosure remain much more flexible at low temperature (for example, as low as −80° C.) than other polybutadiene rubbers of similar or higher cis content.

In further embodiments, the 1,4-polybutadiene polymer may have a cis content of about 85% to about 90%, or about 86% to about 89%. Moreover, the 1,4-polybutadiene rubber may have a vinyl content of at about 1% to about 3%, and a trans content of about 7 to about 10%. Additionally, the 1,4-polybutadiene polymer may have a narrow molecular weight distribution (MWD) of about 2 to about 2.5, or about 2.1 to about 2.25, wherein MWD is defined as $M_w/M_n$ with $M_w$ being a weight average molecular weight and $M_n$ being a number average molecular weight. In additional embodiments, the 1,4-polybutadiene polymer may have a weight average molecular weight of about 200,000 to about 300,000 g/mol, or about 200,000 to about 250,000 g/mol. Moreover, the 1,4-polybutadiene polymers may have a number average molecular weight of about 80,000 g/mol to about 150,000 g/mol, or about 100,000 g/mol to about 120,000 g/mol. Moreover, the 1,4-polybutadiene polymer may have a peak molecular weight ($M_p$) of from about 250,000 g/mol to about 350,000 g/mol, or from about 250,000 g/mol to about 300,000 g/mol.

Various polymerization methods are contemplated as suitable for making the 1,4-polybutadiene compositions of the present disclosure. In one embodiment, the 1,4-polybutadiene compositions are prepared by coordination polymerization, wherein the monomers (for example, conjugated diene monomers) are polymerized by using a coordination catalyst system.

The conjugated diene monomer(s) used herein refers to monomer compositions having at least two double bonds that are separated by a single bond. The processes discussed herein may use at least one conjugated diene monomer containing less than 20 carbon atoms (i.e., 4 to 19 carbons). Examples of conjugated diene monomers include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. While all monomers are considered suitable, the present discussion will focus on the 1,3-butadiene monomer.

Coordination catalysts (also known as Ziegler-Natta catalysts) may comprise a lanthanide compound (e.g., a lanthanide metal complex), an alkylating agent (e.g., an organoaluminum compound), and a halogen compound. The 1,4-polybutadienes produced by coordination polymerization are stereoselective and are particularly suitable for use in tire components such as sidewalls and treads.

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

For example, the lanthanide metal complex may include at least one atom of lanthanum, neodymium, cerium, praseodymium, promethium, samarium, europium, gadolinium, terbium, dysprosium, holmium, erbium, thulium, ytterbium, lutetium, and didymium. In a specific embodiment, the lanthanide compound comprises gadolinium.

The lanthanide atom in the lanthanide metal complex can be in various oxidation states including but not limited to the 0, +2, +3, and +4 oxidation states. Suitable lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds. The lanthanides may also include lanthanide metallocene compounds. In one embodiment, the lanthanide metallocene compound may be bis(2-phenylindenyl)gadolinium bis(dimethylsilyl)amide. Additional details regarding lanthanide metallocene compounds are provided in U.S. Publication U.S. 20140005296, which is incorporated by reference herein in its entirety.

Further as stated above, the catalyst system may comprise an alkylating agent. The alkylating agent may include at least one organoaluminum compound. As used herein, the term organoaluminum compound refers to any aluminum compound containing at least one aluminum-carbon bond. In one or more embodiments, organoaluminum compounds that are soluble in a hydrocarbon solvent can be employed.

For example, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom (e.g., a fluorine, chlorine, bromine, or iodine atom), a carboxylate group, an alkoxide group, or an aryloxide group, and where n can be an integer in the range of from 1 to 3. Where the organoaluminum compound includes a fluorine atom, the organoaluminum compound can serve as both the alkylating agent and at least a portion of the fluorine source in the catalyst system. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbyl aluminum hydride, hydrocarbylaluminum dihydride, dihydrocarbylaluminum carboxylate, hydrocarbylaluminum bis(carboxylate), dihydrocarbyl aluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminium, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, benzyl-n-octylaluminum chloride, diethylaluminum fluoride, di-n-propylaluminum fluoride, diisopropylaluminum fluoride, di-n-butylaluminum fluoride, diisobutylaluminum fluoride, di-n-octylaluminum fluoride, diphenylaluminum fluoride, di-p-tolylaluminum fluoride, dibenzyl aluminum fluoride, phenylethylaluminum fluoride, phenyl-n-propylaluminum fluoride, phenylisopropylaluminum fluoride, phenyl-n-butylaluminum fluoride, phenylisobutylaluminum fluoride, phenyl-n-octylaluminum fluoride, p-tolylethylaluminum fluoride, p-tolyl-n-propylaluminum fluoride, p-tolylisopropylaluminum fluoride, p-tolyl-n-butylaluminum fluoride, p-tolylisobutylaluminum fluoride, p-tolyl-n-octylaluminum fluoride, benzylethylaluminum fluoride, benzyl-n-propylaluminum fluoride, benzylisopropylaluminum fluoride, benzyl-n-butylaluminum fluoride, benzylisobutylaluminum fluoride, and benzyl-n-octylaluminum fluoride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, n-octylaluminum dichloride, ethylaluminum difluoride, n-propylaluminum difluoride, isopropylaluminum difluoride, n-butylaluminum difluoride, isobutylaluminum difluoride, and n-octylaluminum difluoride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present disclosure is aluminoxanes, for example, oligomeric linear aluminoxanes. U.S. Publication No. 2008/0182954 and U.S. Pat. No. 8,987,395, which are incorporated herein by reference in their entirety, provide other examples of aluminoxanes and organoaluminum compounds. In an exemplary embodiment, the alkylating agent is diisobutylaluminum hydride.

Organomagnesium and organozinc compounds are also considered as substitutes or supplements for the organoaluminum. Examples of these organomagnesium and organozinc compounds are provided in U.S. Publication 20140073751, which is incorporated by reference herein in its entirety.

Various halogen compounds, or mixtures thereof, that contain one or more halogen atoms can be employed. These may often be called non-coordinating compounds. Examples of halogen atoms include, but are not limited to, fluorine, chlorine, bromine, and iodine. A combination of two or more halogen compounds having different halogen atoms can also be utilized. In one or more embodiments, the halogen compounds may be soluble in a hydrocarbon solvent. In other embodiments, hydrocarbon-insoluble halogen compounds, which can be suspended in the polymerization medium to form the catalytically active species, may be useful. Suitable types of halogen compounds include elemental halogens, mixed halogens, hydrogen halides, organic halides, inorganic halides, metallic halides, and organometallic halides.

Elemental halogens include fluorine, chlorine, bromine, and iodine. Mixed halogens include iodine monochloride, iodine monobromide, iodine trichloride, and iodine pentafluoride. Hydrogen halides include hydrogen fluoride, hydrogen chloride, hydrogen bromide, and hydrogen iodide. Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide. Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetra(pentafluorophenyl) borate, N,N-dimethylanilinium tetra(pentafluorophenyl) borate, triphenylcarbonium tetra[3,5-bis(trifluoromethyl) phenyl] borate, and N,N-dimethylanilinium tetra[3,5-bis (trifluoromethyl) phenyl]borate. In an exemplary embodiment, the halogen compound is N,N-dimethylanilinium tetra(pentafluorophenyl) borate.

As described above, the inclusion of these 1,4-polybutadiene in the 1,4-polybutadiene rubber compositions provides improved resistance to crystallization at low temperatures. Without being bound by theory, the enthalpy of melting of the 1,4-polybutadiene polymer is one characteristic which correlates to reduced crystallization in low temperature tire applications. For example, the 1,4-polybutadienes may have an enthalpy of melting $\Delta H_m$ of about 5 to about 25 J/g° C. as measured via differential scanning calorimetry (DSC). In a further embodiment, the 1,4-polybutadienes may have an enthalpy of melting $\Delta H_m$ of about 10 to about 20, or about 10 to about 15 J/g° C. as measured via DSC. Moreover, the 1,4-polybutadiene polymers may have a low melting temperature ($T_m$) as measured via differential scanning calorimetry (DSC), which further indicates the resistance to low temperature crystallization. For example, the $T_m$ may be less than −20° C., or less than −25° C. Said another way, the $T_m$ may be from about −20° C. to about −40° C., or about −20° C. to about −30° C.

As stated previously, these rubber compositions may comprise the 1,4-polybutadiene polymer, and various other components and fillers discussed herein, for example reinforcing fillers and curatives. The fillers that can be employed include those fillers that are conventionally employed in the manufacture of tires. Useful fillers include inorganic and organic fillers. The organic fillers include carbon black and starch. The inorganic fillers may include silica, aluminum hydroxide, magnesium hydroxide, clays (hydrated aluminum silicates), and mixtures thereof. In one embodiment, the reinforcing filler may include carbon black, silica, or combinations thereof. In one or more embodiments, the curative may include sulfur or sulfur donors.

In addition to the above described 1,4-polybutadiene polymer, natural rubber or other rubbery elastomers may be included, for example, synthetic rubbers such as polybutadiene, polyisoprene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, or mixtures thereof.

Useful processing or extender oils may also be included. Preferred oils include those that are commercially available as paraffinic, aromatic, or naphthenic oils. In one or more embodiments, the major constituent of the oil is paraffinic. In one embodiment, the extender oil may be oil extended sulfur. The tire components may also include other additives such as anti-ozonants, waxes, scorch inhibiting agents, processing aids, zinc oxide, tackifying resins, reinforcing resins, fatty acids such as stearic acid, peptizers, and one or accelerators.

The anti-ozonants may comprise N,N'-disubstituted-p-phenylenediamines, such as N-1,3-dimethylbutyl-N'-phenyl-p-phenylenediamine (6PPD), N,N'-Bis(1,4-dimethylpentyl)-p-phenylenediamine (77PD), N-phenyl-N-isopropyl-p-phenylenediamine (IPPD), and N-phenyl-N'-(1,3-dimethylbutyl)-p-phenylenediamine (HPPD). Other examples of anti-ozonants include, Acetone diphenylamine condensation product (Alchem BL), 2,4-Trimethyl-1,2-dihydroquinoline (TMQ), Octylated Diphenylamine (ODPA), and 2,6-di-t-butyl-4-methyl phenol (BHT).

The curing accelerators may include, but are not limited to, dithiocarbamate accelerators, including the metal dialkyldithiocarbamates such as, for example, zinc dibutyldithiocarbamate (ZDBDC), zinc diethyldithiocarbamate, zinc dimethyldithiocarbamate, and ferric dimethyldithiocarbamate; thiazole accelerators including 2-mercaptobenzothiazole, the benzothiazole disulfides such as, for example, mercaptobenzothiazole disulfide (MBTS); the benzothiazole sulfenamides, such as, for example, n-cyclohexyl-2-benzothiazole sulfenamide; and sulfenamide accelerators such as, for example, t-butyl-2-benzothiazyl sulfenamide (TBBS). Moreover, the curing accelerators may also include diphenylguanidine (DPG).

Various amounts of the 1,4-polybutadiene polymers are contemplated within the tire components. In one or more embodiments, of the total hundred parts rubber, the 1,4-polybutadiene polymers may include from about 20 to about 100 parts of the 100 total, or about 25 to about 75 parts of the 100 total, especially in embodiments where the 1,4-polybutadiene polymers is blended with natural rubber or the synthetic rubbers listed above.

For tensile properties, the 1,4-polybutadiene rubber compositions may also have a complex modulus $G^*$ at $-20°$ C. from about 10,000,000 to about 20,000,000 Pa, or about 10,000,000 to about 15,000,000 Pa. At a lower temperature of $-30°$ C., the 1,4-polybutadiene rubber compositions may have a complex modulus $G^*$ of from about 10,000,000 to about 20,000,000 Pa, or about 15,000,000 to about 20,000,000 Pa. Without being bound by theory, this complex modulus $G^*$ is indicative of the suitability of 1,4-polybutadiene rubber compositions at lower temperatures.

As further described in the Examples below, the wear index of the 1,4-polybutadiene rubber compositions as measured by the Lambourn wear tester at 25% slip is at least 90%, or at least 95%, or at least 100% (See comparison with Nd high cis BR compositions (Comparative Example 1) in Table 3 below).

EXAMPLES

Example 1 and Comparative Examples 2-4-Synthesis of 1,4-Polybutadiene

To a 2-gallon nitrogen-purged reactor equipped with turbine agitator blades, 1600 g of hexane and 1959 g of 21.3 wt % 1,3-butadiene in hexane was added. The reactor jacket was then set to 50° C. A preformed catalyst was prepared by mixing in the following order: 50 mL of toluene, 5.10 mL of 1.08 M diisobutylaluminum hydride in toluene, 168 mg (0.250 mmol) of bis(2-phenyl indenyl)gadolinium bis(dimethylsilylamide), and 211 mg (0.263 mmol) of N,N-dimethylanilinium tetra(pentafluorophenyl)borate and allowing the mixture to age for 20 minutes at room temperature. The catalyst was then charged into the reactor and the reactor jacket temperature was set to 80° C. About 90 minutes after addition of the catalyst, the resulting polymer cement was dropped into 12 liters of isopropanol containing 5 g of 2,6-di-tert-butyl-4-methylphenol. The coagulated polymer was drum-dried to give 360 g of polymer (86% yield). The properties of the resulting 1,4-polybutadienes are summarized and compared with those of three comparative examples in Table 1 below.

TABLE 1

Properties of 1,4-polybutadienes

| Property | Example 1 (Gd catalyst) | Comparative 1 (High cis BR, Nd catalyst) | Comparative 2 (Low cis BR, BuLi initiator) | Comparative 3 (Cis BR, Nd catalyst) |
|---|---|---|---|---|
| $ML_{1+4}$ at 100° C. | 51.2 | 42.0 | 42.2 | 41.5 |
| $t_{80}$ (s) | 1.74 | 2.50 | 4.17 | 4.40 |
| $M_n$ | 108147 | 102908 | 84858 | 87616 |
| $M_w$ | 238791 | 236036 | 206032 | 221347 |
| $M_p$ | 271342 | 487971 | 431891 | 212089 |
| $M_w/M_n$ | 2.21 | 2.29 | 2.43 | 2.53 |
| % cis-1,4-linkage | 87.78 | 96.4 | 33 | 89.3 |
| % trans-1,4-linkage | 9.75 | 3.0 | 55 | 10.1 |
| % 1,2-linkage | 2.47 | 0.6 | 12 | 0.6 |

TABLE 1-continued

Properties of 1,4-polybutadienes

| Property | Example 1 (Gd catalyst) | Comparative 1 (High cis BR, Nd catalyst) | Comparative 2 (Low cis BR, BuLi initiator) | Comparative 3 (Cis BR, Nd catalyst) |
|---|---|---|---|---|
| $T_m$ | −27.1 | −7.65 | N/A | −10.08 |
| $\Delta H_m$ (J/g ° C.) | 12.76 | 36.30 | N/A | 32.2 |

The exemplary embodiment, Example 1, which is a gadolinium catalyzed polybutadiene polymer, was evaluated in a carbon black filled compound and was compared with: a commercial grade high cis (96%) polybutadiene rubber (Comparative Example 1) which was polymerized by using a Nd catalyst; a commercial grade low cis (33%) polybutadiene rubber which was polymerized by using a BuLi catalyst (Comparative Example 2); and with an 89% cis polybutadiene rubber which was polymerized by using a Nd catalyst (Comparative Example 3). These compositions are shown in Table 2 below.

TABLE 2

Compositions including the 1,4-polybutadiene rubbers of Table 1

| Component | Example 1 | Comparative Example 1 | Comparative Example 2 | Comparative Example 3 |
|---|---|---|---|---|
| Masterbatch | | | | |
| Polybutadiene | 100 | 100 | 100 | 100 |
| Carbon Black | 50 | 50 | 50 | 50 |
| Black Oil | 10 | 10 | 10 | 10 |
| Stearic Acid | 2 | 2 | 2 | 2 |
| Wax | 2 | 2 | 2 | 2 |
| 6PPD | 0.95 | 0.95 | 0.95 | 0.95 |
| Final | | | | |
| Masterbatch | 164.95 | 164.95 | 164.95 | 164.95 |
| Sulfur | 1.5 | 1.5 | 1.5 | 1.5 |
| MBTS | 0.5 | 0.5 | 0.5 | 0.5 |
| TBBS | 0.5 | 0.5 | 0.5 | 0.5 |
| DPG | 0.3 | 0.3 | 0.3 | 0.3 |
| ZnO | 2.5 | 2.5 | 2.5 | 2.5 |

Figure 1:
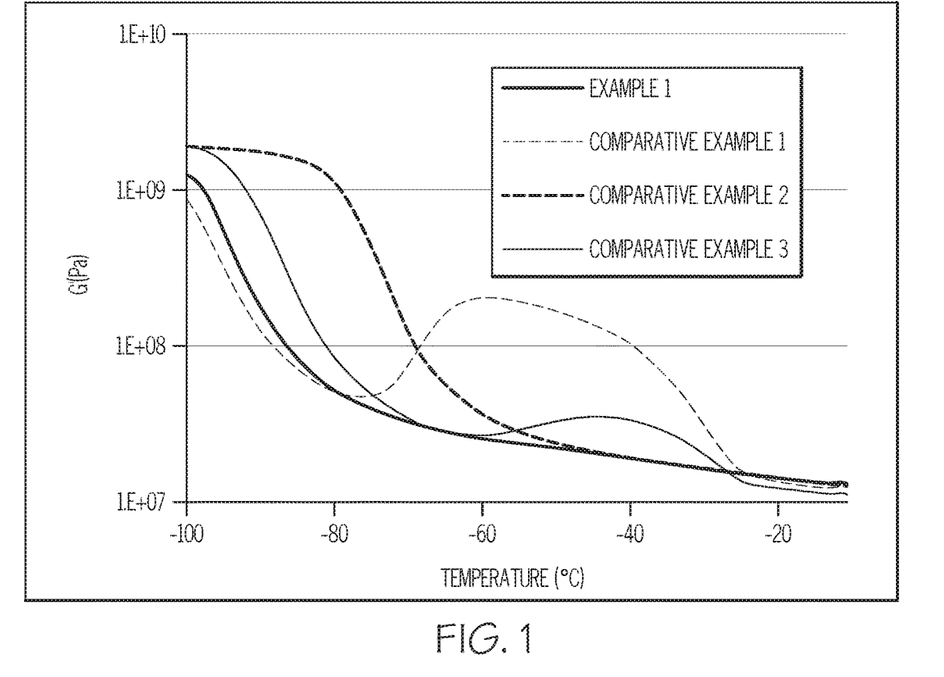
FIG. 1 is a graph depicting the storage modulus at low temperatures for one embodiment of the present 1,4-polybutadiene rubber compositions versus other comparative 1,4-polybutadiene rubber compositions in accordance with one or more embodiments of the present disclosure.

Referring to the graph of FIG. 1, the Example 1 composition exhibited surprisingly excellent performance at low temperatures as demonstrated by the storage modulus measured from a temperature sweep. The Example 1 rubber composition was as soft as a polybutadiene rubber composition with 33% cis (Comparative Example 2) at temperatures as low as about −30° C. and remained softer as temperature further decreased. This result was unexpected, because of the relatively high cis content of this rubber. In fact, the Nd catalyzed polybutadiene rubber composition of similar cis content (89%) (Comparative Example 3) stiffened at low temperatures between −60° C. and −20° C.

As shown in Table 3 below, Example 1 remained softer as indicated by lower complex modulus at −30° C. than higher cis (96%) polybutadiene rubber composition (Comparative Example 1) or approximately the same cis (89%) (Comparative Example 3). Table 3—Dynamic mechanical properties of compositions including the 1,4-polybutadiene rubbers of Table 1

TABLE 3

Complex Modulus G* values

|  | Example 1 | Comparative Example 1 | Comparative Example 2 | Comparative Example 3 |
|---|---|---|---|---|
| G* (Pa) at −30° C. | $1.63 \times 10^7$ | $3.27 \times 10^7$ | $1.68 \times 10^7$ | $2.09 \times 10^7$ |
| G* (Pa) at −20° C. | $1.44 \times 10^7$ | $1.39 \times 10^7$ | $1.44 \times 10^7$ | $1.25 \times 10^7$ |

Figure 2:
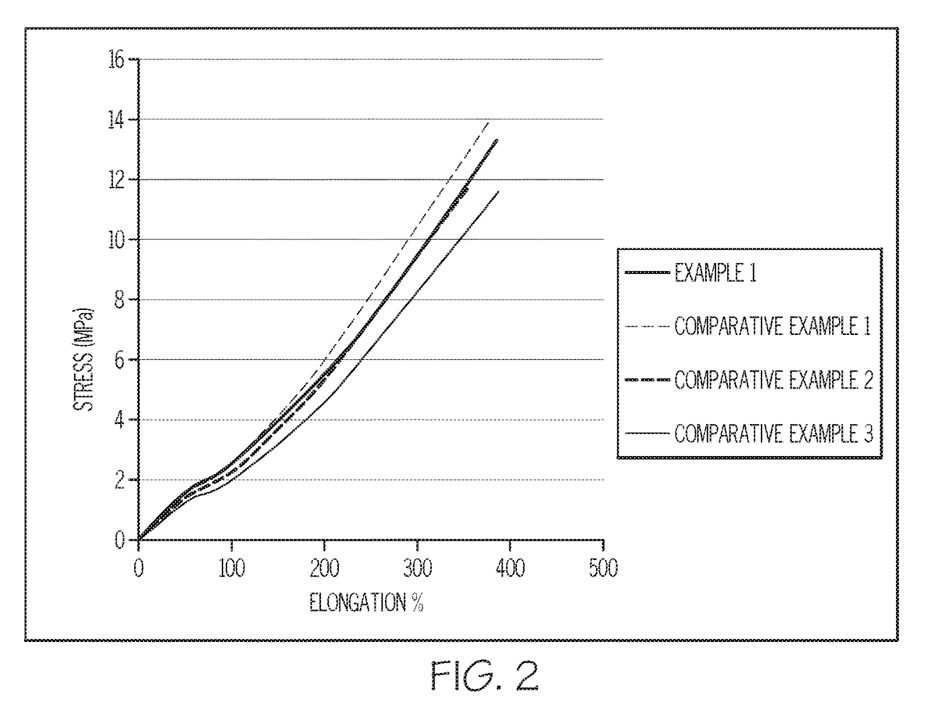
FIG. 2 is a graph depicting the tensile properties at room temperature for one embodiment of the present 1,4-polybutadiene rubber compositions versus other comparative 1,4-polybutadiene rubber compositions in accordance with one or more embodiments of the present disclosure.

Referring to FIG. 2, the low cis (33%) composition (Comparative Example 2) exhibited lower tensile strength and elongation at break than the 96% cis polybutadiene rubber composition (Comparative Example 1). The 89% cis Nd polybutadiene rubber composition (Comparative Example 3) achieved lower modulus than Comparative Example 1 over the entire elongation range. However, Example 1 demonstrated comparable tensile properties to Comparative Example 1. Thus, in addition to superior performance at low temperatures, Example 1 also demonstrates excellent tensile properties.

Regarding wear loss as measured by a Lambourn Wear Tester, even though the low cis polybutadiene example (Comparative Example 2) maintained its performance at low temperatures as demonstrated by the G* values of Table 3, the wear resistance was significantly worse than the 96% cis polybutadiene (Comparative Example 1). However, the wear resistance of Example 1 was comparable to Comparative Example 1 at a 25% slip condition, while still maintaining that low temperature performance discussed above. This is shown in Table 4 below.

TABLE 4

Wear Index of the compositions including the 1,4-polybutadiene rubbers of Table 1

|  | Example 1 | Comparative Example 1 | Comparative Example 2 | Comparative Example 3 |
|---|---|---|---|---|
| Wear Index, at 25% slip | 103% | 100% | 53% | 94% |

Testing Methods

Mooney Viscosity:

The Mooney viscosities of polymers disclosed herein were determined at 100° C. using an Alpha Technologies Mooney viscometer with a large rotor, a one minute warm-up time, and a four minute running time. More specifically, the Mooney viscosity was measured by preheating each polymer to 100° C. for one minute before the rotor starts. The Mooney viscosity was recorded for each sample as the torque at four minutes after the rotor started. Torque relaxation was recorded after completing the four minutes of measurement. The $t_{80}$ values represent the time required for decaying 80% of the torque of each polymer.

Gel Permeation Chromatography (GPC) and Fourier Transform Infrared Spectroscopy (FTIR)

The molecular weight ($M_n$, $M_w$ and $M_p$-peak $M_n$ of GPC curve) and molecular weight distribution ($M_w/M_n$) of the polymers were determined by GPC. The GPC measurements disclosed herein are calibrated with polybutadiene standards and Mark-Houwink constants for the polydienes produced.

Differential Scanning Calorimetry (DSC):

DSC measurements were made on a TA Instruments Q2000 with helium purge gas and an LNCS accessory for cooling. The sample was prepared in a TZero aluminum pan and scanned at 10 deg C./min over the temperature range of interest.

The microstructures (cis, trans and vinyl contents) of the polymers were determined by FTIR. Specifically, the samples are dissolved in $CS_2$ and subjected to FTIR on a Perkin Elmer Spectrum GX instrument.

Viscoelastic Properties:

Viscoelastic properties of cured rubber compounds were measured by a temperature sweep test conducted with an Advanced Rheometric Expansion System (ARES) from TA Instruments. The test specimen had a rectangular geometry having a length of 47 mm, a thickness of 2 mm, and a width of 12.7 mm. The length of specimen between the grips on the test machine, i.e., the gap, is approximately 27 mm. The test was conducted using a frequency of 62.8 rad/sec. The temperature is started at −100° C. and increased to 100° C. The strain is 0.1% or 0.25% for the temperature range of −100° C. to −10° C., and 2% for the temperature range of −10° C. and above.

Tensile Properties:

Tensile mechanical properties were determined following the guidelines, but not restricted to, the standard procedure described in ASTM D412, using micro dumbbell specimens with a dimension of 4 mm in width and 1.91 mm in thickness. A specific gauge length of 44 mm was used for the tensile test. Specimens were strained at a constant rate and the resulting force was recorded as a function of extension (strain). Force readings were expressed as engineering stresses by reference to the original cross-sectional area of the test piece. The specimens were tested at 23° C. The same tensile mechanical properties were also tested at 100° C. Maximum stress and maximum strain percentage were also measured at both temperatures.

Abrasion Resistance:

Abrasion resistance of the rubber compositions (as a tire wear performance indicator) was measured using a Lambourn Abrasion Tester. A circular test specimen was placed on an axle and run against an abrasive surface at 25% slip ratio generated by the difference of linear speeds of the abrasive surface and the sample surface. Talc powder was used as a lubricant. The test specimen was weighed before testing and after testing to determine the amount of material loss and a wear index was calculated using the average rate of material loss (typically using 3-5 data points).

A first aspect of the present disclosure may be directed to a polymer comprising 1,4-polybutadiene having a cis content of at least 85 to about 92%, a vinyl content of at about 1% to about 5%, and a trans content of about 3 to about 12%, wherein the polymer has an enthalpy of melting $\Delta H_m$ of about 5 to about 25 J/g° C. as measured via differential scanning calorimetry (DSC).

A second aspect of the present disclosure may include the first aspect, wherein the cis content is about 85% to about 90%, the vinyl content is about 1 to about 3%, and the trans content is about 5 to about 10%.

A third aspect of the present disclosure may include the first and second aspects, wherein the 1,4-polybutadiene has a melting temperature ($T_m$) from about −20° C. to about −40° C.

A fourth aspect of the present disclosure may include any of the first through third aspects, wherein the 1,4-polybutadiene has a peak molecular weight between about 250,000 g/mol to about 350,000 g/mol.

A fifth aspect of the present disclosure may include any of the first through fourth aspects, wherein the enthalpy of melting $\Delta H_m$ is about 10 to about 20 J/g° C. as measured via differential scanning calorimetry (DSC).

A sixth aspect of the present disclosure may be directed to a rubber composition, which may include the polymer of any of the first through fifth aspects, reinforcing filler, and a curative.

An eighth aspect of the present disclosure may include the sixth or seventh aspects, wherein the reinforcing filler comprises sulfur and the curative comprises carbon black.

A ninth aspect of the present disclosure may include any of the sixth through eighth aspects, wherein the rubber composition further comprises further comprising natural rubber, additional synthetic rubber, or combinations thereof.

A tenth aspect of the present disclosure may include the ninth aspect, wherein the additional synthetic rubber comprises polybutadiene, polyisoprene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, or mixtures thereof.

An eleventh aspect of the present disclosure may be directed to a method, the method comprising polymerizing a solution comprising 1,3-butadiene to yield 1,4-polybutadiene having a cis content of at least 85 to about 92%, a vinyl content of at about 1% to about 5%, and a trans content of about 3 to about 12%, wherein the polymerization is catalyzed with a catalyst comprising a lanthanide metal complex, wherein the 1,4-polybutadiene has an enthalpy of melting $\Delta H_m$ of about 5 to about 25 J/g° C. as measured via differential scanning calorimetry (DSC).

A twelfth aspect of the present disclosure may include the eleventh aspect, wherein the lanthanide metal complex comprises one or more of lanthanum, neodymium, cerium, praseodymium, promethium, samarium, europium, gadolinium, terbium, dysprosium, holmium, erbium, thulium, ytterbium, lutetium, and didymium.

A thirteenth aspect of the present disclosure may include any of the eleventh or twelfth aspects, wherein the lanthanide metal complex comprises gadolinium.

A fourteenth aspect of the present disclosure may include any of the eleventh through thirteenth aspects, wherein the catalyst further comprises a non-coordinating compound and an alkylating agent.

A fifteenth aspect of the present disclosure may include any of the eleventh through fourteenth aspects, wherein the cis content is about 85% to about 90%, the vinyl content is about 1 to about 3%, and the trans content is of about 5 to about 10%.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A polymer comprising:
   1,4-polybutadiene having a cis content of at least 85% to about 92%,
   wherein the polymer has an enthalpy of melting $\Delta H_m$ of 5 to 25 J/g° C. as measured via differential scanning calorimetry (DSC), and
   wherein the 1,4-polybutadiene has a peak molecular weight between about 250,000 g/mol to about 350,000 g/mol.

2. The polymer of claim 1, wherein the peak molecular weight is between about 250,000 g/mol to about 300,000 g/mol.

3. The polymer of claim 1, wherein the cis content is about 85% to about 90%.

4. The polymer of claim 1, wherein the 1,4-polybutadiene has a vinyl content of about 1% to about 5% and a trans content of about 3% to about 12%.

5. The polymer of claim 4, wherein the vinyl content is about 1% to about 3% and the trans content is about 5% to about 10%.

6. The polymer of claim 1, wherein polymer has a number average molecular weight of 80,000 g/mol to 150,000 g/mol.

7. The polymer of claim 6, wherein the number average molecular weight is about 80,000 g/mol to about 120,000 g/mol.

8. The polymer of claim 1, wherein the 1,4-polybutadiene has a melting temperature (Tm) from about −20° C. to about −40° C.

9. The polymer of claim 1, wherein the enthalpy of melting $\Delta H_m$ is about 10 to about 20 J/g° C. as measured via differential scanning calmimetry (DSC).

10. A rubber composition comprising:
    the polymer of claim 1;
    reinforcing filler; and
    a curative.

11. The rubber composition of claim 10 wherein the rubber composition has a complex modulus G* at −30° C. of about 10,000,000 to about 20,000,000 Pa.

12. The rubber composition of claim 10, wherein the reinforcing filler comprises sulfur and the curative comprises carbon black.

13. The rubber composition of claim 10, further comprising natural rubber, additional synthetic rubber, or combinations thereof.

14. The rubber composition of claim 13, wherein the additional synthetic rubber comprises polybutadiene, polyisoprene, polyisobutylene-co-isoprene, neoprene, poly(ethylene-co-propylene), poly(styrene-co-butadiene), poly(styrene-co-isoprene), and poly(styrene-coisoprene-co-butadiene), poly(isoprene-co-butadiene), poly(ethylene-co-propylene-co-diene), polysulfide rubber, acrylic rubber, urethane rubber, silicone rubber, epichlorohydrin rubber, or mixtures thereof.

15. A method comprising:
    polymerizing a solution comprising 1,3-butadiene to yield 1,4-polybutadiene having a cis content of at least 85 to about 92%, wherein the polymerization is catalyzed with a catalyst comprising a lanthanide metal complex,
    wherein the 1,4-polybutadiene has an enthalpy of melting $\Delta H_m$ of about 5 to about 25 J/g° C. as measured via differential scanning calorimetry (DSC), and
    wherein the 1,4-polybutadiene has a peak molecular weight between about 250,000 g/mol to about 350,000 g/mol.

16. The method of claim 15, wherein the lanthanide metal complex comprises one or more of lanthanum, neodymium, cerium, praseodymium, promethium, samarium, europium, gadolinium, terbium, dysprosium, holmium, erbium, thulium, ytterbium, lutetium, and didymium.

17. The method of claim 15, wherein the lanthanide metal complex comprises gadolinium.

18. The method of claim 15, wherein the catalyst further comprises a non-coordinating compound and an alkylating agent.

19. The method of claim 15, wherein the cis content is about 85% to about 90%.

20. The polymer of claim 15, wherein the polymer has a number average molecular weight of 80,000 g/mol to 150,000 g/mol.

\* \* \* \* \*